(12) United States Patent
Enserink et al.

(10) Patent No.: US 10,490,889 B1
(45) Date of Patent: Nov. 26, 2019

(54) METHODS AND SYSTEMS FOR IMPROVING COMMUNICATION USING ANGLE DITHERING

(71) Applicant: TrellisWare Technologies, Inc., San Diego, CA (US)

(72) Inventors: Scott W. Enserink, San Diego, CA (US); Cenk Köse, San Diego, CA (US); Marcus T. Urie, San Diego, CA (US)

(73) Assignee: TRELLISWARE TECHNOLOGIES, INC., San Diego, CA (US)

( * ) Notice: Subject to any disclaimer, the term of this patent is extended or adjusted under 35 U.S.C. 154(b) by 300 days.

(21) Appl. No.: 15/663,422

(22) Filed: Jul. 28, 2017

Related U.S. Application Data

(60) Provisional application No. 62/384,076, filed on Sep. 6, 2016.

(51) Int. Cl.
| | |
|---|---|
| *H01Q 3/00* | (2006.01) |
| *H04B 7/06* | (2006.01) |
| *H04B 1/10* | (2006.01) |
| *H04W 72/08* | (2009.01) |
| *H04W 72/04* | (2009.01) |

(52) U.S. Cl.
CPC .......... *H01Q 3/005* (2013.01); *H04B 1/1081* (2013.01); *H04B 7/061* (2013.01); *H04W 72/046* (2013.01); *H04W 72/085* (2013.01)

(58) Field of Classification Search
CPC ............ H01Q 3/005; H01Q 3/08; H01Q 3/04; H01Q 1/1257; H01Q 1/125; H01Q 1/3275
USPC ......................................................... 342/359
See application file for complete search history.

(56) References Cited

U.S. PATENT DOCUMENTS

| | | | | |
|---|---|---|---|---|
| 4,347,514 A | * | 8/1982 | Birkemeier | .......... H01Q 1/1257 342/367 |
| 2017/0219621 A1 | * | 8/2017 | Andreev | ................ G01Q 20/02 |

* cited by examiner

*Primary Examiner* — Harry K Liu
(74) *Attorney, Agent, or Firm* — Perkins Coie LLP

(57) ABSTRACT

Methods and systems for improving communication using angle dithering are presented. Embodiments of the present invention provide increased throughput and robustness after link establishment by providing fast fading characteristics in environments dominated by slow fading. In particular, fast fading characteristics are induced by steering the transmitter and receiver antennas in optical and beyond line-of-sight troposcatter communication systems based on dither patterns. In non-line-of-sight (NLOS) communication systems, using coordinated dither patterns at the transmitter and receiver ensures that successive common scattering volumes become decorrelated, whereas in line-of-sight optical communication systems, the dither pattern is based on the tropospheric scintillation in free space traversed by the established link.

20 Claims, 7 Drawing Sheets

FIG. 10
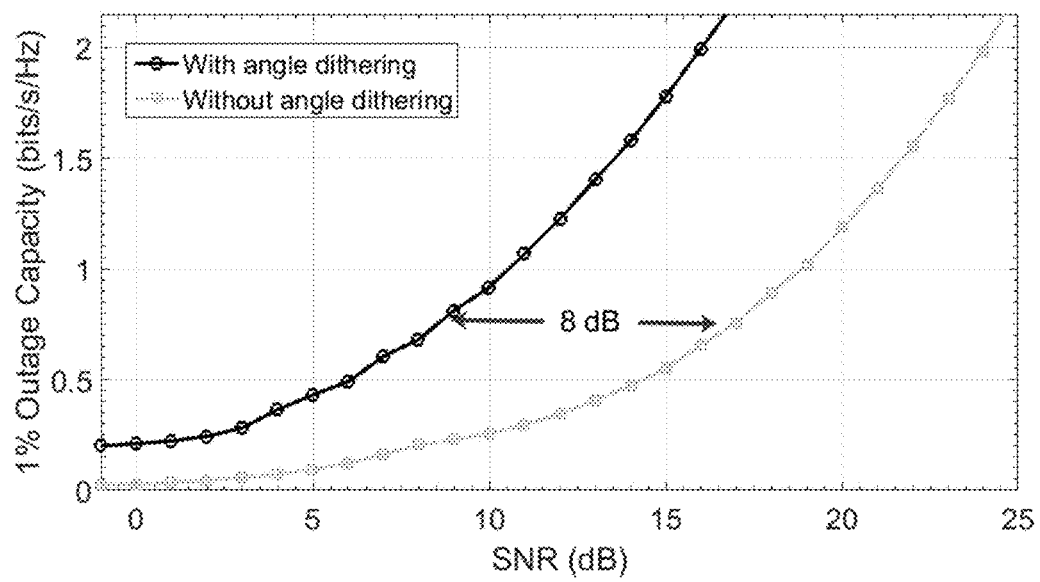
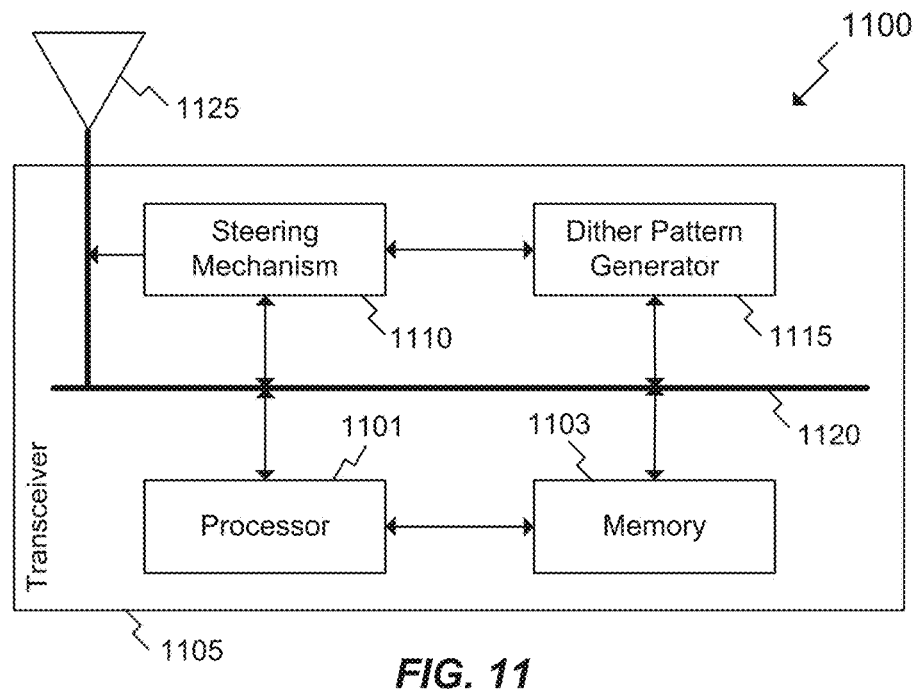
FIG. 11

METHODS AND SYSTEMS FOR IMPROVING COMMUNICATION USING ANGLE DITHERING

CROSS-REFERENCES TO RELATED APPLICATIONS

This application claims the benefit of U.S. Provisional Application No. 62/384,076, filed Sep. 6, 2016, which is hereby expressly incorporated herein by reference in its entirety for all purposes.

FIELD OF THE INVENTION

The present invention relates generally to wireless communication, and particularly to methods and systems for tropospheric scatter and optical communication.

BACKGROUND

A defining characteristic of a wireless channel is the variations of the channel strength over time and over frequency. The variations can be roughly divided into two types as shown in FIG. 1—slow fading (or large-scale fading) and fast fading (or small-scale fading). Slow fading is due to path loss the signal experiences as a function of distance and shadowing by large objects such as buildings or hills, and is typically independent of frequency for the bandwidths of interest. In contrast, fast fading is due to the constructive and destructive interference of the multiple signal paths between the transmitter and the receiver, and is typically frequency dependent.

A related characteristic of the wireless channel is the coherence time, which is a measure of the minimum time required for a magnitude change or phase change of the wireless channel to become decorrelated from its previous value. In the context of the coherence time, the wireless channel is defined as exhibiting slow fading if the coherence time is much longer than the delay requirement (or latency) of the application, and exhibiting fast fading if the coherence time is shorter. The operational significance of this definition is that, in a fast fading channel, coded (or uncoded) symbols can be transmitted over multiple fades of the wireless channel, whereas in a slow fading channel, the symbols experience only a single realization of the wireless channel. Thus, in a fast fading channel, a receiver may exploit the inherent time diversity of the fast fading channel in order to increase the throughput or reliability of the link. However, in the presence of a deep fade (reduction of the channel magnitude to a value less than that required to maintain an acceptable bit error rate), receiver performance is negatively impacted for that duration. The ability to induce fast fading from multiple decorrelated fading processes enables the receiver to improve communication performance.

SUMMARY

Thus, it is an object of the present invention to provide methods and systems, including computer program products, for improved communication using angle dithering, which provides fast fading characteristics in an environment and wireless channel dominated by slow fading. For example, in one embodiment, a method for improved communication between a first node comprising a first antenna and a second node comprising a second antenna, using angle dithering comprises establishing the link using the first and second antennas, wherein the established link comprises an initial common scattering volume, steering the first antenna based on a first dither pattern, and steering the second antenna based on a second dither pattern, wherein the second dither pattern is based on the first dither pattern, wherein at least one of the first and second dither patterns is either a random dither pattern or a predetermined dither pattern, wherein the first and second antennas are steered simultaneously, wherein the established link further comprises at least one subsequent common scattering volume, and wherein the at least one subsequent common scattering volume is different from the initial common scattering volume.

These illustrative embodiments are mentioned not to limit or define the limits of the present subject matter, but to provide examples to aid in the understanding thereof. Illustrative embodiments are discussed in the Detailed Description, and further examples are provided there. Advantages offered by various embodiments may be further understood by examining this specification and/or by practicing one or more embodiments of the claimed subject matter.

BRIEF DESCRIPTION OF THE DRAWINGS

FIG. 10 plots results showing the improvement in the 1% outage capacity, according to an embodiment of the present invention; and FIG. 11 is a block diagram of a device implemented as a node for improved communication using angle dithering, according to an embodiment of the present invention.

Figure 1:
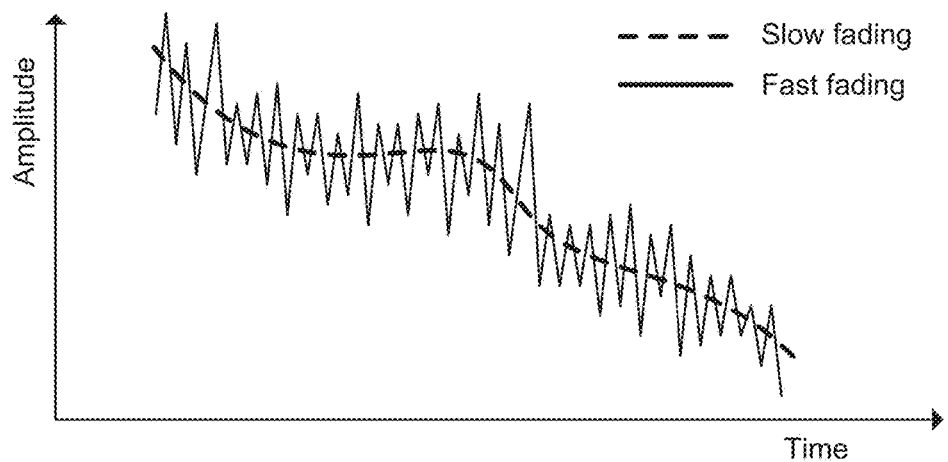
FIG. 1 is a diagram comparing slow fading and fast fading in representative wireless channels.

Like labels are used to refer to the same or similar modules in the drawings.

DETAILED DESCRIPTION

Figure 2:
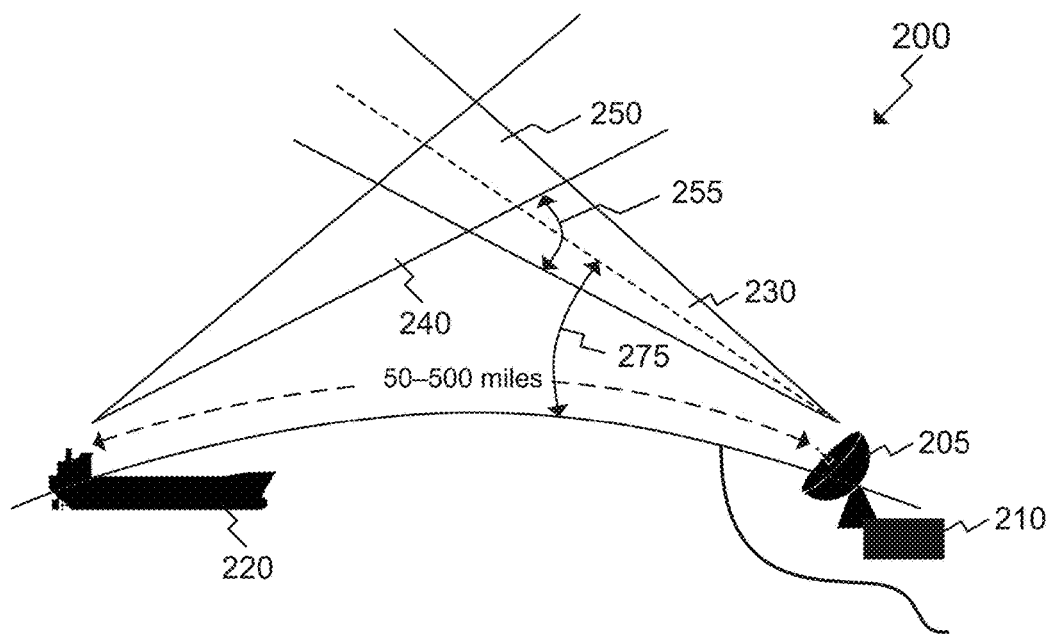
FIG. 2 is a simplified diagram of an embodiment for beyond line-of-sight tropospheric scatter communication.

FIG. 2 is a simplified diagram of an embodiment for beyond line-of-sight (also known as over-the-horizon or non-line-of-sight) tropospheric scatter communication. The troposphere is the lowest region of the atmosphere that extends from the earth's surface to a height of 6-20 km (depending on the latitude), which is the lower boundary of the stratosphere. As shown therein, a first node 210 with a first antenna 205 may communicate with a second node 220 with a second antenna (not shown in FIG. 2), which may be up to 500 miles away, using operating frequencies in the VHF band and above.

The troposcatter communication shown in FIG. 2 relies on the random scattering of the transmitted signals due to the turbulent eddies of the troposphere. That is, because the troposphere is turbulent and contains many super-imposed eddies whose slight differences in water vapor density and temperature result in differences in the index of refraction between the eddies, the radio signals are refracted and consequently some portion of the radio energy is collected by the receiving antennas. The magnitude of the received signal depends on the strength of the turbulences causing scatter in the desired direction, the size of their index of refraction differences, and the gains of the transmitting and receiving antennas.

The first node 210 transmits a signal in a first narrow beam, at a takeoff angle 275, aimed just above the horizon in the direction of the second node 220. As the transmitted signal 230 passes through the troposphere, some of the energy is scattered back toward the earth via a second beam, which enables the second node 220 to pick up the reflected signal 240. Specifically, the portion of the troposphere that comprises the scattering, and wherein the transmitted signal 230 and the reflected signal 240 intersect, is defined as a common scattering volume 250. The angle 255 through which the transmitted signal 230 must be scattered in order to ensure that the reflected signal 240 reaches the second antenna (not shown in FIG. 2) is referred to as the scattering angle.

The takeoff angle (also referred to as the elevation angle), in conjunction with the distance between the nodes as well as the elevation of each node, determines the height of the common scattering volume and the size of the scattering angle. A low takeoff angle produces a low-altitude common scattering volume. As the takeoff angle is increased, the height of the common scattering volume and the scattering angle increases. The increased scattering angle and the amount of turbulence typically decreasing with height contribute to a decrease in the amount of received energy.

Decreasing turbulence with increasing height represents a simplified model adopted for some embodiments of the present invention. For other embodiments, the Hufnagel-Valley model (commonly termed HV5/7) may be adopted, wherein the turbulence decreases as the altitude increases to 6 km, then increases from an altitude of 6 km to 10 km, and then continues to decrease above an altitude of 10 km. Embodiments of the present invention provide fast fading characteristics in wireless channels dominated by slow fading by steering the antennas at the first and second nodes. The dither patterns used to steer the antennas may be based on the turbulence model adopted for that embodiment.

In an embodiment, the first antenna 205 may be a dish antenna ranging in size from 0.5 meters to 12 meters (to support operating frequencies from ranging from VHF to 30 GHz) with typical amplifiers ranging from 10 W to 2 kW. Although dish antennas are the most common type of antenna used for troposcatter links, phased arrays are increasing in use, and Yagi antennas are also deployed at VHF and UHF frequencies.

Figure 3:
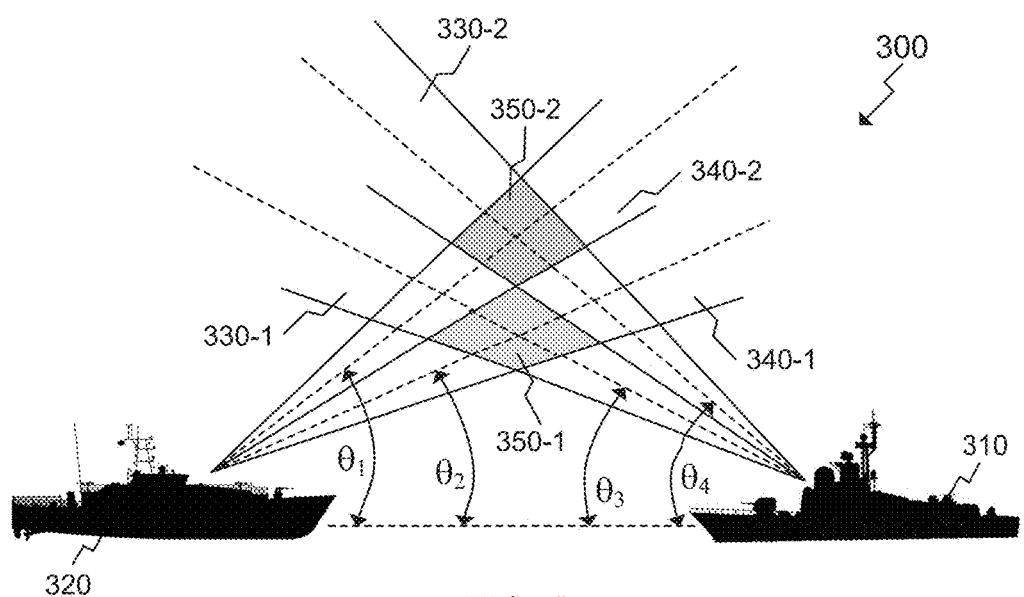
FIG. 3 is a simplified diagram showing elevation angle diversity, according to an embodiment of the present invention.

FIG. 3 shows a simplified diagram illustrating elevation angle diversity, according to an embodiment of the present invention, and includes some features and/or components that are similar to those shown in FIG. 2. At least some of these features and/or components may not be separately described in this section.

As shown in FIG. 3, a first node 310 initially transmits a signal at an elevation angle (or equivalently, the takeoff angle) of $\theta_3$, which results in an initial common scattering volume 350-1 that scatters some portion of the energy of the transmitted signal 330-1. The reflected signal 340-1 is received by the second node 320 at an elevation angle of $\theta_2$. In an embodiment (for example, if the common scattering volume happens to be directly between the first and second nodes), the elevation angles $\theta_2$ and $\theta_3$ are equal. In other embodiments, the initial elevation angles are not necessarily the same.

At a time subsequent to the time of transmission of the initial transmitted signal 330-1, the first node 310 transmits another signal at an elevation angle $\theta_4$, which results in a subsequent common scattering volume 350-2. The subsequent reflected signal 340-2 is received by the second node 320 at an elevation angle of $\theta_1$. Elevation angles $\theta_3$ and $\theta_4$ are components of a first dither pattern used to steer the antenna located at the first node 310, and similarly, elevation angles $\theta_1$ and $\theta_2$ are components of a second dither pattern used to steer the antenna located at the second node 320. Embodiments of the present invention may select the second dither pattern based on the first dither pattern in order to maintain common scattering volumes.

In an environment dominated by slow fading, fast fading characteristics are achieved by using the first and second dither patterns at the first and second nodes, respectively. Specifically, varying the elevation angle as discussed above results in the initial common scattering volume 350-1 becoming decorrelated with the subsequent common scattering volume 350-2, thereby enabling the receiver to exploit the diversity in channel fading levels. In an embodiment, the first node 310 may be a mobile at-sea communication node that may comprise a stabilization platform or a point-and-tracking platform that is used to steer the antenna based on the first dither pattern.

Embodiments of the present invention assume that the receiver is capable of exploiting the diversity in a fast fading wireless channel. That is, the channel gain fluctuates substantially in a time scale that is shorter than the latency requirement, and the receiver processing is able to track the fluctuations. In an embodiment, receiver processing may comprise interleaving and/or channel coding, which enables the receiver to exploit the independent fades across information symbols in a fast-fading wireless channel, thereby improving system performance.

Figure 4:
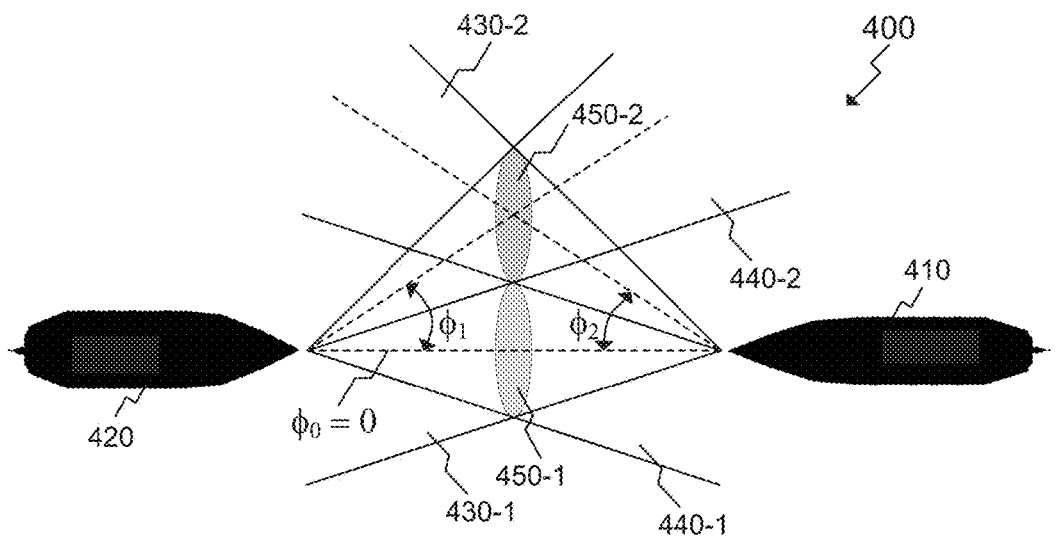
FIG. 4 is a simplified diagram showing azimuth angle diversity, according to an embodiment of the present invention.

FIG. 4 shows a simplified diagram illustrating azimuth angle diversity, according to an embodiment of the present invention, and includes some features and/or components that are similar to those shown in FIGS. 2 and 3. At least some of these features and/or components may not be separately described in this section.

As shown in FIG. 4, a first node 410 initially transmits a signal at an azimuth angle of $\phi_0=0$, which results in an initial common scattering volume 450-1 that reflects the signal to the second node 420, which receives a portion of the signal energy at the same azimuth angle. At a subsequent time, another transmitted signal 430-2 from the first node 410 at an azimuth angle of $\phi_2$ results in a subsequent common scattering volume 450-2. As previously discussed, the subsequent common scattering volume is decorrelated from the prior common scattering volume, thereby imparting fast fading characteristics to a wireless channel that may be dominated by slow fading, and resulting in improved communications between the two nodes.

In the context of FIGS. 3 and 4, assume that the signal produced by the initial scattering volume (350-1 and 450-1, respectively) is a random Gaussian process $X_1(t)$, the signal produced by the subsequent scattering volume (350-2 and 450-2, respectively), which is adjacent to the initial scattering volume, is a random Gaussian process $X_2(t)$. It is further assumed that both random Gaussian processes have identical correlation functions $r(\tau)$, and that they are decorrelated. For a simplified mixing model, the signal produced by the common scattering volume may be $$\overline{X}(t) = \lambda(t)X_1(t) + \sqrt{1-\lambda^2(t)}X_2(t),$$

where $0 < \lambda(t) < 1$ is based on the angle dithering pattern. The resulting $\overline{X}(t)$, which is a weighted sum of random Gaussian processes, is also a random Gaussian process.

In the case of this simplified mixing model, which assumes mixing of the initial and subsequent scattering volumes, the correlation function of $\overline{X}$ can be computed as $$\overline{r}(t,\tau) = [\lambda(t)\lambda(t-\tau) + \sqrt{1-\lambda^2(t)}\sqrt{1-\lambda^2(t-\tau)}]r(\tau).$$

In a more realistic scenario, mixing would result in common scattering volumes that comprised portions of the initial and subsequent scattering volumes, as well as portions of the troposphere that existed in the vicinity of the component scattering volumes. In an embodiment, $\lambda(t)$ may be based on sweeping through a dithering pattern in either a linear or a sinusoidal time varying manner to increase the time diversity of the resulting process, thereby improving communication over the link.

In contrast, in the absence of angle dithering, which is equivalent to setting $\lambda(t) = \lambda$, such that the resulting random Gaussian process will have the correlation function $\overline{r}(\tau) = r(\tau)$, which is identical to the original correlation function. That is, no additional diversity is achieved in the absence of angle dithering after link establishment.

Thus, a time-varying $\lambda(t)$, as described above, provides additional diversity. That is, an appropriate choice of dither pattern and time variation may be employed to provide fast fading characteristics in an environment dominated by slow fading, which is one of the primary advantages of embodiments of the present invention.

Figure 5:
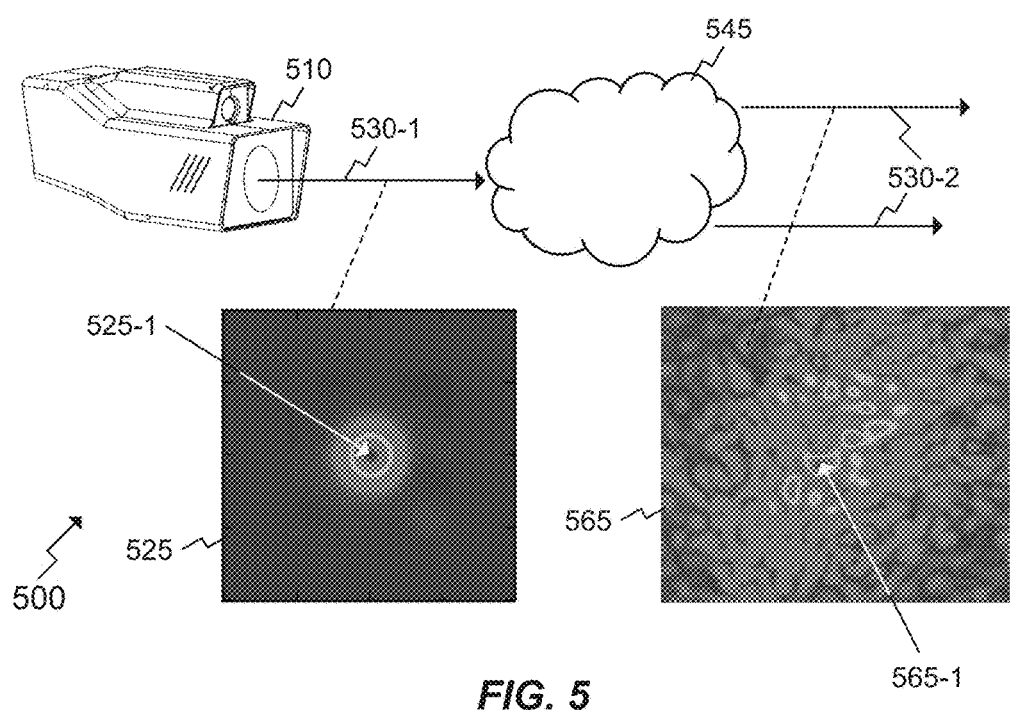
FIG. 5 is a simplified diagram of an embodiment for line-of-sight optical communication.

FIG. 5 is a simplified diagram of an embodiment for line-of-sight optical communication, which comprises a first node 510 that transmits an optical signal. An intensity map (or pattern) for a signal shows the average number of photons hitting a region. As seen in the intensity map 525, the transmitted signal 530-1 is highly focused beam with the peak intensity 525-1 at the center of the intensity map. The transmitted signal 530-1 is subject to tropospheric scintillation 545, which results in the dispersion of the transmitted signal. The spatial dispersion is due to the random focusing and defocusing of the signal energy, which is caused by the index of refraction irregularities caused by the turbulence. That is, the amount of spatial dispersion is a function of the level of tropospheric turbulence.

The intensity map 565 of the dispersed signal 530-2 shows that the peak intensity 565-1 may not necessarily be at the same position as in the case of the transmitted signal 530-1. In addition, the intensity pattern of the dispersed signal is a function of time since atmospheric scintillation is typically time-varying. Embodiments of the present invention may be employed to operate in the presence of high levels of atmospheric scintillation.

Figure 6:
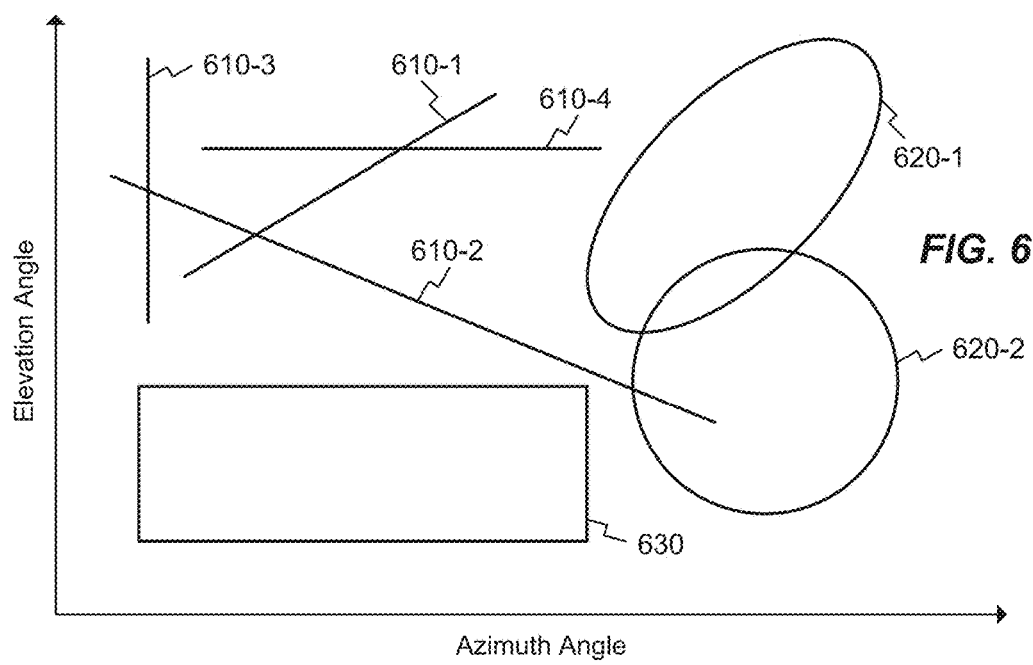
FIG. 6 shows dither patterns in the elevation and azimuth angle plane, according to embodiments of the present invention.

FIG. 6 shows predetermined dither patterns in the elevation and azimuth angle plane, according to embodiments of the present invention. Embodiments of the present invention may employ a variety of dither patterns in order to ensure that consecutive common scattering volumes are decorrelated, thereby achieving fast fading characteristics in a wireless channel dominated by slow fading. That is, the dither patterns are selected at the first and second nodes in a coordinated manner to ensure that consecutive common scattering volumes exist, and that they are spatially and/or temporally separated to ensure that diversity is achieved.

FIG. 6 shows linear dithering patterns 610-1 through 610-4, wherein both the azimuth and elevation angles are varied in patterns 610-1 and 610-2. In contrast, patterns 610-3 and 610-4 correspond to varying only the elevation angle and azimuth angle, respectively, which have been previously detailed in the context of FIGS. 3 and 4, respectively. FIG. 6 also shows conical dither patterns 620-1 and 620-2, and a rectangular dither pattern 630. The dither patterns shown are exemplary, and do not limit the predetermined dither patterns that may be implemented.

Figure 7A:
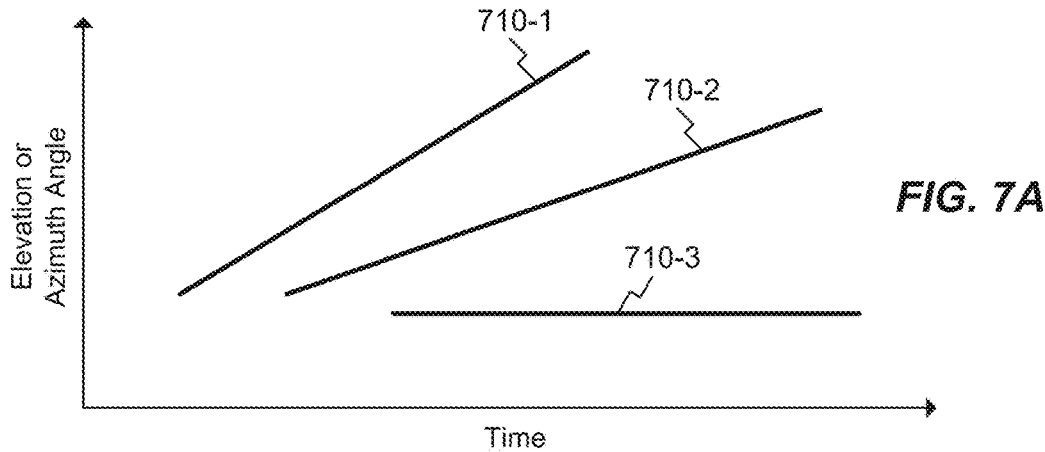
FIGS. 7A, 7B and 7C show dither patterns for the elevation or azimuth angle as a function of time, according to an embodiment of the present invention.
Figure 7B:
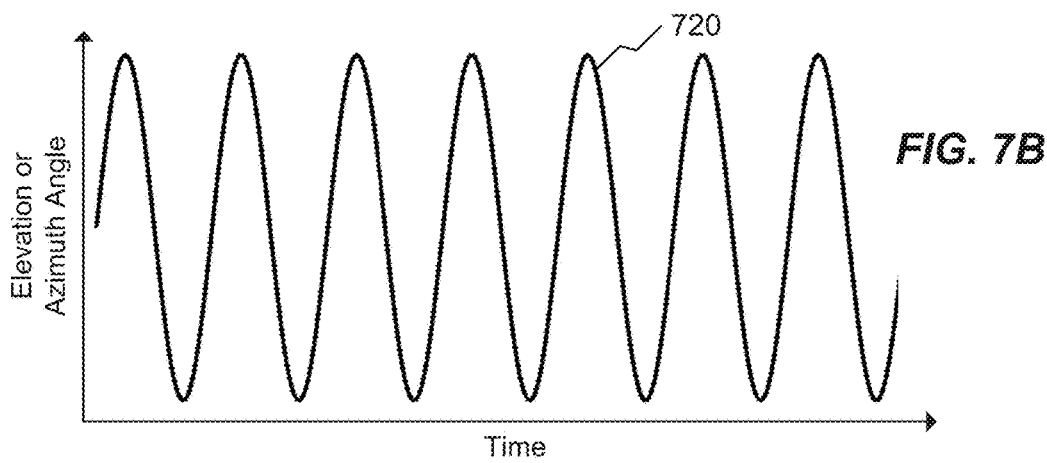
Figure 7C:
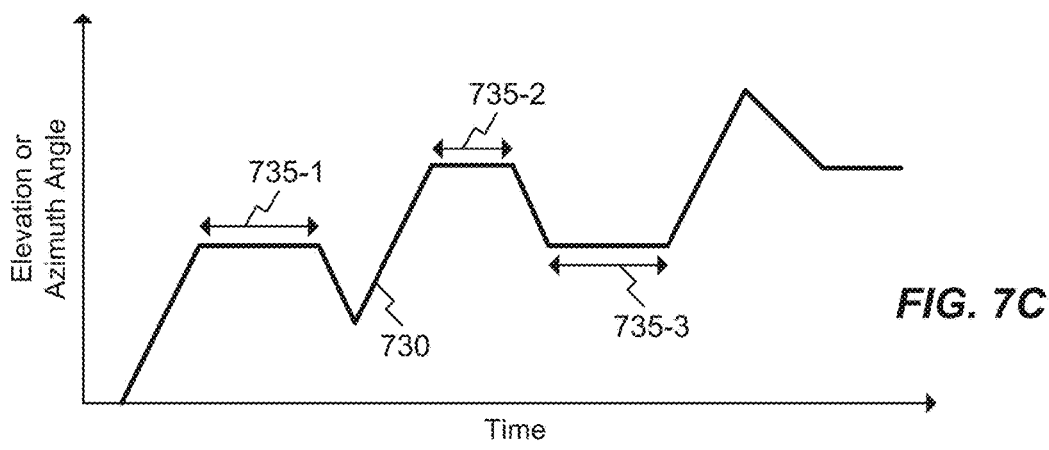

FIGS. 7A, 7B and 7C show dither patterns for the elevation or azimuth angle as a function of time, according to an embodiment of the present invention. In particular, FIG. 7A shows dither patterns that vary linearly in time, wherein 710-3 represents a degenerate dither pattern. That is, a node that implements a degenerate dither pattern results in the antenna remaining static after link establishment. Embodiments of the present invention may employ different antennas, with markedly different radiation patterns, at the first and second nodes. In an embodiment, one of the nodes (with a narrow main lobe in the radiation pattern) may implement a dither pattern shown in FIG. 6 and the other node (with a wide main lobe in the radiation pattern) may implement a degenerate dither pattern.

FIG. 7B shows a sinusoidal dither pattern 720 that has a fixed frequency. In an embodiment, a sinusoidally swept dither pattern may be employed for angle dithering since a large percentage of the sweep time is spent at maximum displacements, where the initial and subsequent volumes have minimal overlap, relative to the time spent transitioning between the maximum displacements.

FIG. 7C shows a sawtooth dither pattern 730 that varies linearly (piece-wise) in time, but is interspersed with dwell times (735-1, 735-2 and 735-3), which are defined as time periods in which the antenna remains static. That is, the elevation and/or azimuth angles remain unchanged for the duration of the dwell time. In an embodiment, the duration of the dwell time may be based on the coherence time of the wireless channel.

A plurality of dwell times may be interspersed within any dither pattern, including the exemplary dither patterns shown in FIG. 6. The duration of each of the dwell times in the plurality of dwell times may be independently selected. In different embodiments, the dwell times may either be uniformly distributed or randomly distributed within the dither pattern. In other embodiments, a first subset of dwell times may be randomly distributed and a second subset may be uniformly distributed.

Figure 8:
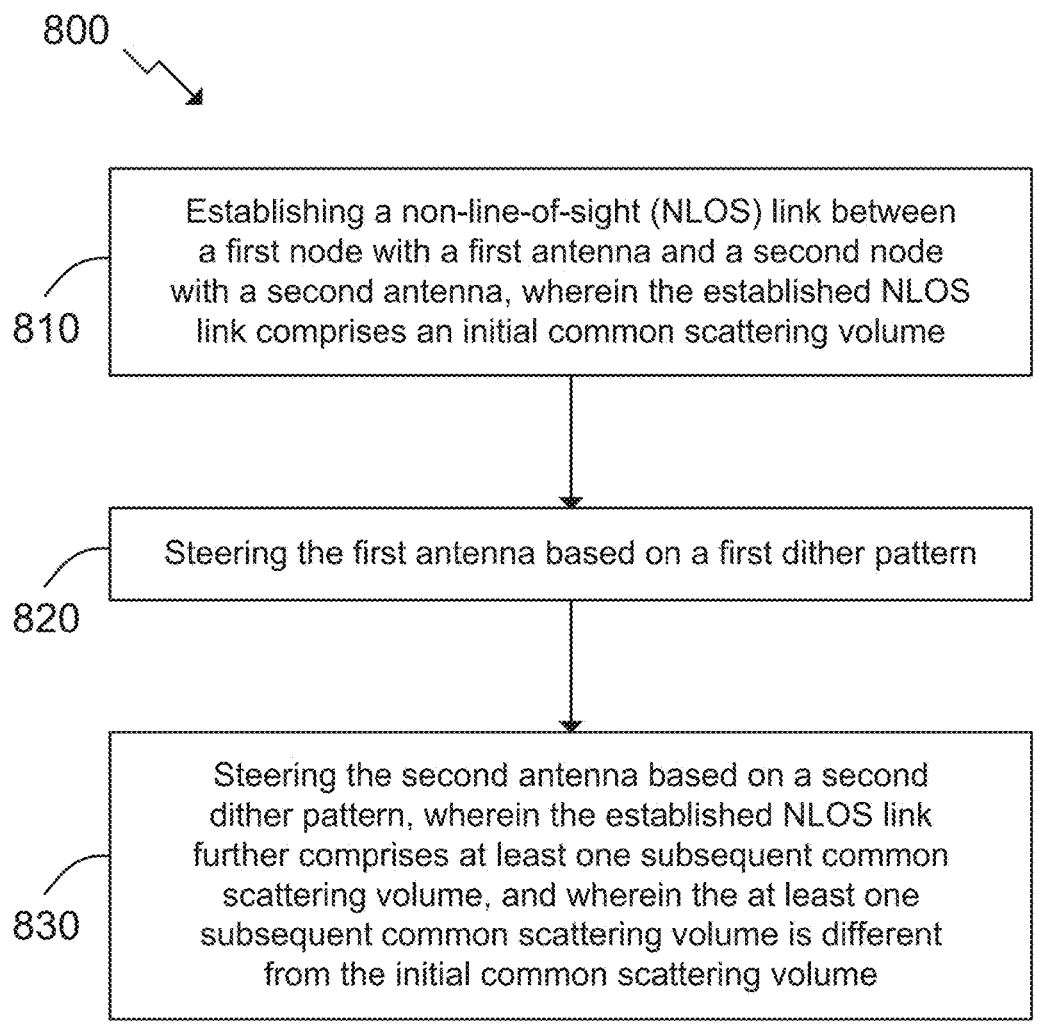
FIG. 8 is a flowchart for a method for improved communication using angle dithering, according to an embodiment of the present invention.

FIG. 8 is a flowchart for a method for improved angle dithering, according to an embodiment of the present invention. In some embodiments, the order of the steps in the flowchart may be changed. Furthermore, some of the steps in the flowchart may be skipped or additional steps may be added.

The method 800 begins at step 810 wherein a non-line-of-sight (NLOS) link between a first node and a second node is established. After the link has been established in an RF or optical NLOS communication system, there exists an initial scattering volume that comprises a portion of the atmosphere that scatters the transmitted signal such that the reflected signal is received by the second node.

At step 820, an antenna at the first node is steered based on a first dither pattern. In an embodiment, the antenna may be a dish antenna with either a single or multiple feeds, which may be steered mechanically. However, mechanical steering of a dish antenna typically requires significant power, and high wind conditions may result in imprecise steering. An alternative steering mechanism comprises mechanically moving the position of the feed(s) in the vertical and/or horizontal plane, but this method is susceptible to some performance degradation since the feed(s) are steered away from the optimum focal position. In yet another alternative, multiple parasitic elements displaced vertically or symmetrically about the feed element(s) may be switched to steer the radiation pattern. Any of the aforementioned steering mechanisms may be used to dither parabolic dish antennas to implement embodiments of the present invention.

In another embodiment, the antenna may comprise multiple parabolic dishes, each of which may comprise one or more feeds. Each of the available parabolic dishes may be steered using one of the steering mechanisms described above.

In yet another embodiment, the antenna may be a phased array that comprises an array of antenna elements, each with a phase shifter that can electronically alter the phase for the signal being transmitted through the corresponding antenna element. That is, the radiation beam is electronically steered by adjusting the phases of the antenna elements and requires no mechanical steering mechanisms. The phased array may be typically used for embodiments of the present invention that have operating frequencies that are in the UHF band or higher.

In other embodiments, the antenna may be a Yagi antenna, which usually comprises multiple parallel elements (that are typically half-wave dipoles) in a line, and may be used for embodiments of the present invention that have operating frequencies that are in the VHF and UHF bands. In an embodiment, the Yagi antenna may be mechanically steered.

At step 830, an antenna at the second node is steered based on a second dither pattern, which is based on the first dither pattern. That is, the first and second dither patterns are selected in a coordinated manner to ensure that the initial common scattering volume is followed by a plurality of subsequent common scattering volumes, at least one of which is different from the initial scattering volume. In some embodiments, the first and second antennas may be steered simultaneously.

As discussed previously, dither patterns are selected so as to ensure that each of the subsequent common scattering volumes becomes decorrelated from the one that preceded it. This decorrelation imparts fast fading characteristics to a wireless channel that may be dominated by slow fading. Angle dithering after link establishment improves communication by, for example, increasing throughput and robustness over the link.

Figure 9:
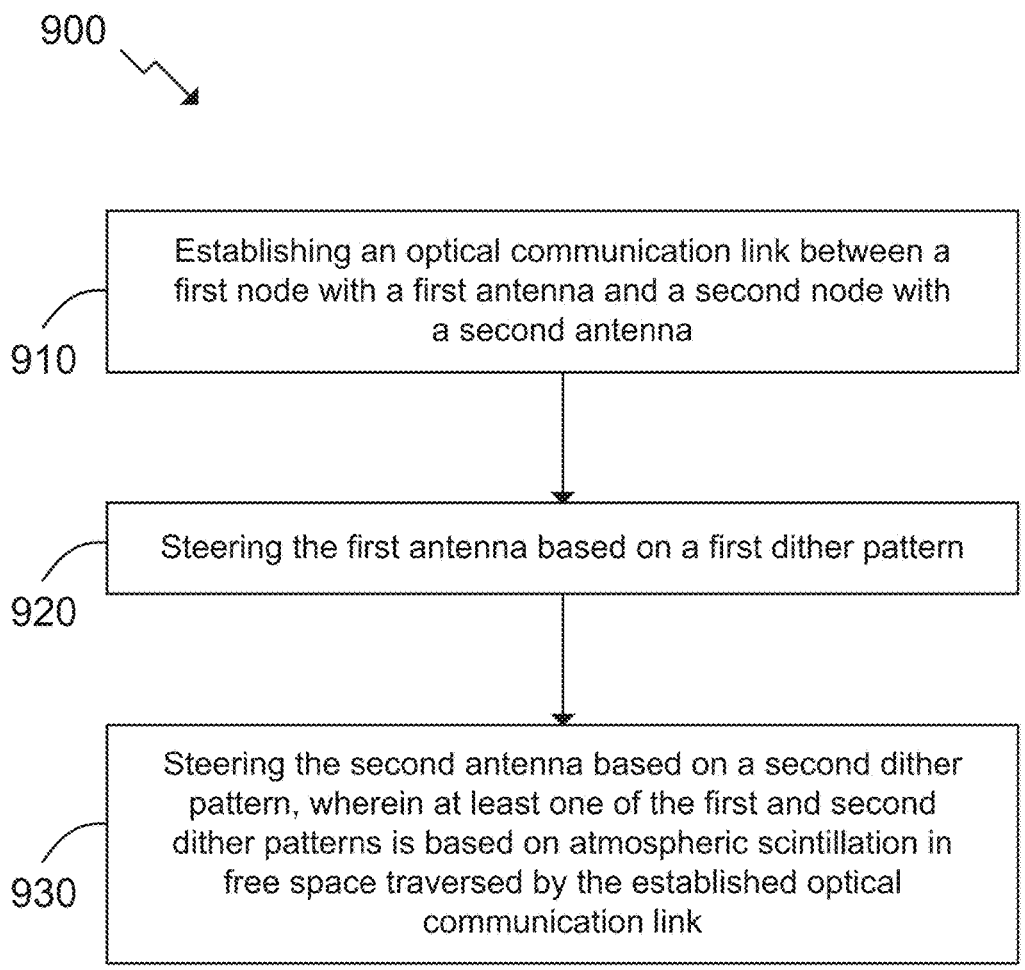
FIG. 9 is a flowchart for a method for improved communication using angle dithering, according to another embodiment of the present invention.

FIG. 9 is a flowchart for a method for improved angle dithering, according to another embodiment of the present invention. In some embodiments, the order of the steps in the flowchart may be changed. Furthermore, some of the steps in the flowchart may be skipped or additional steps may be added. This flowchart includes some steps that are similar to those shown in FIG. 8 and described above. At least some of these steps may not be separately described in this section.

The method 900 begins at step 910 wherein a line-of-sight free-space optical (FSO) communication link is established between a first node with a first optical antenna and a second node with a second optical antenna. The optical antennas may operate at visible (390-750 nm), infrared (750-1600 nm) or ultraviolet (200-280 nm) light frequencies, and employ on-off keying (OOK) signaling.

At step 920, the first optical antenna at the first node is steered based on a first dither pattern. At step 930, the second optical antenna is steered based on a second dither pattern. At least one of the first and second dither patterns is based on atmospheric scintillation in free space traversed by the established optical communication link. In an embodiment, the optical antenna may be a pencil radiating antenna, which tightly bundles the radiated energy in both the azimuth and elevation angles to ensure an extremely thin beam. A gimbal or optical mount may also be deployed to provide precise angular positioning, rate and acceleration to implement the dither patterns, according to embodiments of the present invention.

In an embodiment, and in the context of FIG. 5, the first node 510 may use an optical antenna, which transmits an optical signal that is affected by the atmospheric scintillation 545 and results in a dispersed intensity pattern 565. The first node 510 may employ a uniform (or non-uniform) dither pattern that further results in the intensity map evolving in space. That is, the high- and low-intensity portions of the map shift in space as a function of time. The second node (not shown in FIG. 5) may employ a degenerate dither pattern that captures the energy in the dispersed signal. In another embodiment, both the first and second nodes may use complementary dither patterns to ensure that decorrelated common scattering volumes are leveraged to provide fast fading characteristics.

FIG. 10 shows the improvement in the outage capacity for a simulated system implementing an embodiment of the present invention. Recall that the capacity of an additive white Gaussian noise (AWGN) wireless channel is given by $C_{AWGN} \approx \log_2(1+SNR)$, wherein SNR is the instantaneous signal-to-noise ratio. In other words, if a transmitter encodes data at a rate $R \leq C_{AWGN}$, the probability of a decoding error at a receiver can be made arbitrarily small for a sufficiently large block length.

However, in a slow-fading wireless channel, there is no definite capacity as the maximum rate of reliable communication supported by the channel depends on the random channel gain h, and is given by $C \approx \log_2(1+|h|^2 SNR)$. That is, if a transmitter encodes data at a rate of R bits/s/Hz, there is a non-zero probability that the decoding error at a receiver cannot be made arbitrarily small, irrespective of the block size.

The outage probability is given by $$p_{out} = \mathbb{P}\{\log_2(1+|h|^2 SNR) < R\},$$

and it is possible to determine the largest value of R such that the outage probability $p_{out}$ is less than $\varepsilon$. This value is known as the $\varepsilon$-outage capacity.

In the example shown in FIG. 10, the 1% outage capacity is plotted as a function of the SNR for a 100-mile link operating at 14.5 GHz with a 50 ms block length, in which both the transmitter and receiver antennas are dithered with sinusoidal time variations in the azimuth direction. The simulated dithering was ±0.25 beam widths at a rate of 19 Hz, and produced a performance gain of approximately 8 dB.

A transceiver 1105 for improving communication using angle dithering, according to an embodiment of the present invention, is shown in FIG. 11. This transceiver is provided merely as an example that may be used with the methods described herein. A processor 1101 is connected to a memory 1103 that interfaces with a dither pattern generator 1115, a steering mechanism 1110 and an antenna 1125 via an interface 1120. The dither pattern generator 1115 may be configured to generate dither patterns used by the steering mechanism 1110 to steer the antenna 1125 to provide fast fading characteristics in wireless channel environments that are dominated by slow fading.

In an embodiment, the dither pattern generator 1115 and the steering mechanism 1110 may be embedded in the processor 1101. In another embodiment, the dither pattern generator 1115 may be implemented in a field programmable gate array (FPGA) and the steering mechanism 1110 may be implemented in software. In yet another embodiment, the dither pattern generator 1115 and the steering mechanism 1110 may be implemented in software, either in an ARM or other processor.

The processor 1101 may comprise component digital processors, and may be configured to execute computer-executable program instructions stored in memory 1103. For example, the component digital processors may execute one or more computer programs for enabling improved communications using angle dithering in accordance with some embodiments of the present invention.

Processor 1101 may comprise a variety of implementations for programming a transceiver 1105, communicating with the embedded radio definition module, and receiving one or more parameters, as well as a microprocessor, a digital signal processor (DSP), an application-specific integrated circuit (ASIC), one or more field programmable gate arrays (FPGAs), state machines, or the like. Processor 1101 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or another similar device.

Memory 1103 may comprise a non-transitory computer-readable medium that stores instructions which, when executed by the processor 1101, cause the processor 1101 to perform various steps, such as those described herein. Examples of computer-readable media include, but are not limited to, electronic, optical, magnetic, or other storage or transmission devices capable of providing the processor 1101 with computer-readable instructions. Other examples of computer-readable media comprise, but are not limited to, a floppy disk, CD-ROM, magnetic disk, memory chip, ROM, RAM, ASIC, configured processor, any optical medium, any magnetic tape or other magnetic medium, or any other medium from which a computer processor can access data. In addition, various other devices may include a computer-readable medium such as a router, private or public network, or other transmission device. The processor 1101 and the processing described may be in one or more structures, or may be dispersed throughout one or more structures.

Embodiments in accordance with aspects of the present subject matter can be implemented in digital electronic circuitry, computer hardware, firmware, software, or in combinations of the preceding. In one embodiment, a computer may comprise a processor or processors. A processor comprises or has access to a computer-readable medium, such as a random access memory (RAM) coupled to the processor.

While the present subject matter has been described in detail with respect to specific embodiments thereof, it will be appreciated that those skilled in the art, upon attaining an understanding of the foregoing, may readily produce modifications to, variations of, and equivalents to such embodiments. Accordingly, it should be understood that the present disclosure has been presented for purposes of example rather than limitation, and does not preclude inclusion of such modifications to, variations of and/or additions to the present subject matter as would be readily apparent to one of ordinary skill in the art.

What is claimed:

1. A method for improving communication over a link between a first node and a second node in a communication system, the first node comprising a first antenna, the second node comprising a second antenna, the method comprising:
   establishing the link using the first and second antennas, wherein the established link comprises an initial common scattering volume;
   steering the first antenna based on a first dither pattern; and
   steering the second antenna based on a second dither pattern, wherein the first and second antennas are steered simultaneously, wherein the second dither pattern is based on the first dither pattern, wherein at least one of the first and second dither patterns is either a random dither pattern or a predetermined dither pattern, wherein the established link further comprises at least one subsequent common scattering volume, and wherein the at least one subsequent common scattering volume is different from the initial common scattering volume.

2. The method of claim 1, wherein the communication system is either a tropospheric scatter communication system or a non-line-of-sight optical communication system.

3. The method of claim 1, wherein at least one of the first and second nodes comprise a stabilization platform.

4. The method of claim 1, wherein either the first dither pattern or the second dither pattern is a degenerate dither pattern.

5. The method of claim 1, wherein the predetermined dither pattern is selected from the group consisting of a conical pattern, a sinusoidal pattern, and a linear pattern.

6. The method of claim 5, wherein the conical pattern or the sinusoidal pattern varies both an elevation angle and an azimuth angle of at least one of the first and second antennas.

7. The method of claim 5, wherein the linear pattern or the sinusoidal pattern varies either an elevation angle or an azimuth angle of at least one of the first and second antennas.

8. The method of claim 5, wherein at least one of the first and second antennas are steered based on the predetermined dither pattern that varies either linearly or sinusoidally in time.

9. The method of claim 1, wherein at least one of the first and second dither patterns comprise a plurality of dwell times.

10. The method of claim 9, wherein each of the plurality of dwell times is uniformly spaced within the at least one of the first and second dither patterns.

11. The method of claim 9, wherein each of the plurality of dwell times is randomly distributed within the at least one of the first and second dither patterns.

12. The method of claim 1, wherein at least one of the first and second antennas is selected from the group consisting of (i) a single-feed, single-dish antenna, (ii) a multi-feed, multi-dish antenna, (iii) a multi-feed, single-dish antenna, (iv) a single-feed, multi-dish antennas, and (v) a phased array.

13. The method of claim 1, wherein the first node is a mobile node.

14. The method of claim 13, wherein the first node is a vessel at-sea and comprises either a point-and-tracking platform or a stabilization platform.

15. A system for improving communication over an established link in a communication system, the established link comprising an initial common scattering volume, the system comprising:
a first node comprising a first antenna; and
a second node comprising a second antenna,
wherein the first node is configured to steer the first antenna based on a first dither pattern, wherein the second node is configured to steer the second antenna based on a second dither pattern, wherein the first and second antennas are steered simultaneously, wherein the second dither pattern is based on the first dither pattern, wherein at least one of the first and second dither patterns is either a random dither pattern or a predetermined dither pattern, wherein the established link further comprises at least one subsequent common scattering volume, and wherein the at least one subsequent common scattering volume is different from the initial common scattering volume.

16. The system of claim 15, wherein the communication system is either a tropospheric scatter communication system or a non-line-of-sight optical communication system.

17. The system of claim 15, wherein either the first dither pattern or the second dither pattern is a degenerate dither pattern.

18. A system for improving communication over an established link in a line-of-sight optical communication system, the system comprising:
a first node comprising a first antenna; and
a second node comprising a second antenna,
wherein the first node is configured to steer the first antenna based on a first dither pattern, wherein the second node is configured to steer the second antenna based on a second dither pattern, wherein the first and second antennas are steered simultaneously, wherein at least one of the first and second dither patterns is based on atmospheric scintillation in free space traversed by the established link, and wherein at least one of the first and second dither patterns is either a random dither pattern or a predetermined dither pattern.

19. The system of claim 18, wherein either the first dither pattern or the second dither patterns is a degenerate dither pattern.

20. The system of claim 18, wherein at least one of the first and second dither patterns comprise a plurality of dwell times.

* * * * *